(12) United States Patent
Franklin, Jr.

(10) Patent No.: US 6,182,458 B1
(45) Date of Patent: Feb. 6, 2001

(54) APPARATUS AND METHOD FOR PRODUCING $CO_2$ SNOW AND/OR ICE IN SHIPPING CONTAINER

(76) Inventor: Paul R. Franklin, Jr., 5211 W. Beaver St., Jacksonville, FL (US) 32254

( * ) Notice: Under 35 U.S.C. 154(b), the term of this patent shall be extended for 0 days.

(21) Appl. No.: 09/388,544

(22) Filed: Sep. 2, 1999

(51) Int. Cl.[7] ................................................. B60H 1/32
(52) U.S. Cl. ................................ 62/239; 62/347; 62/384
(58) Field of Search ........................... 62/239, 384, 388, 62/74, 347

(56) References Cited

U.S. PATENT DOCUMENTS

| | | | |
|---|---|---|---|
| 3,762,176 | 10/1973 | Coggins, Jr. | 62/74 |
| 4,111,362 | 9/1978 | Carter, Jr. | 239/1 |
| 4,404,818 | 9/1983 | Franklin, Jr. | 62/384 |
| 4,612,777 | * 9/1986 | Noma et al. | 62/247 |
| 4,640,460 | 2/1987 | Franklin, Jr. | 239/2.2 |
| 4,838,039 | 6/1989 | Knodel | 62/330 |
| 4,848,095 | 7/1989 | Franklin | 62/121 |
| 5,092,133 | 3/1992 | Franklin | 62/59 |
| 5,154,064 | 10/1992 | Franklin | 62/59 |
| 5,193,354 | * 3/1993 | Kleinberger et al. | 62/247 |
| 5,295,368 | 3/1994 | Franklin | 62/307 |
| 5,337,579 | 8/1994 | Saia, III et al. | 62/239 |
| 5,398,522 | 3/1995 | Franklin, Jr. | 62/384 |
| 5,505,055 | 4/1996 | Franklin, Jr. | 62/74 |
| 5,775,111 | 7/1998 | Franklin | 62/74 |
| 6,003,326 | * 12/1999 | Hensley | 62/247 |

* cited by examiner

Primary Examiner—William E. Tapolcai
(74) Attorney, Agent, or Firm—Jacobson, Price, Holman & Stern, PLLC

(57) ABSTRACT

An apparatus and method is provided for precipitating water ice or $CO_2$ snow downwardly over a load within a shipping container or semitrailer body. The apparatus and method utilize high pressure and high velocity fog-like spray discharges of liquid $CO_2$ and water (for forming water ice) or opposing high pressure and high velocity fog-like spray discharges of liquid $CO_2$ (for forming $CO_2$ snow) for intimate commingling in an elevated area of the container or semitrailer body. The commingling fog-like jet discharges of water and liquid $CO_2$ cause water ice precipitation downward over a load within the container or semitrailer body and are capable of producing ice at a rate (poundage) equal to generally 96% of the rate (poundage) at which liquid $CO_2$ is consumed in forming the water ice. Further, the opposing and commingling high pressure and high velocity fog-like spray discharges of liquid $CO_2$ cause $CO_2$ snow to form and to precipitate downward over an associated load.

8 Claims, 5 Drawing Sheets

APPARATUS AND METHOD FOR PRODUCING CO₂ SNOW AND/OR ICE IN SHIPPING CONTAINER

BACKGROUND OF THE INVENTION

1. Field of the Invention

This invention relates to an apparatus and method for quickly and economically forming water ice or $CO_2$ snow over a load of perishables disposed within an elongated storage container such as a semitrailer body or a shipping container. High pressure, highly atomized fog-like jets of liquid $CO_2$ and $H_2O$ are produced over a load to be chilled and the finely atomized fog-like discharges are relatively positioned so as to rapidly commingle and produce ice and/or $CO_2$ snow precipitation over the load.

2. Description of Related Art

Various different methods and apparatuses for forming ice and/or $CO_2$ snow heretofore have been known, such as those disclosed in U.S. Pat. Nos. 3,762,176, 4,111,362, 4,838,039, 5,154,064 and 5,295,368. Ice is typically about a 50/50 mixture of water and $CO_2$ and forms temperatures of about +20° F. to +32° F. $CO_2$ snow, on the other hand, is 100% $CO_2$ and has a temperature of about −110° F. When making ice by mixing water and liquid $C_2$, it is desirable to utilize the lowest ratio of liquid $CO_2$ to water, and to achieve the highest conversion of water to ice, so as to improve the economics and efficacy of the system.

The apparatus disclosed in U.S. Pat. No. 3,762,176 forms ice within a divergent nozzle terminal end of an elongated water supply tube and the cryogenic fluid is discharged under pressure into the terminal end nozzle at a rate which must be precisely controlled to prevent water freezing within the terminal end nozzle before discharging therefrom. The system disclosed in U.S. Pat. No. 4,111,362 discharges precisely positioned jets of liquid $CO_2$ into a mixing chamber in such a manner that the kinetic energy of all of the liquid $CO_2$ jets is dissipated. U.S. Pat. No. 4,838,039 discloses an apparatus wherein ice is produced from aqueous liquids by directly contacting the aqueous liquids with a liquified refrigerant.

My earlier U.S. Pat. Nos. 5,154,064, 5,295,368 and 5,505,055 disclose apparatus for forming ice by mixing liquid $CO_2$ and $H_2O$ in various ways. The apparatus disclosed in my U.S. Pat. No. 5,505,055 is particularly adapted for forming ice particles over a load of perishables disposed within an insulated storage or shipping container or the like by discharging opposing spray jets of liquid $CO_2$ and water toward each other. However, the apparatus of my aforementioned prior patents are not effective in maximizing the cooling capability of the liquid $CO_2$. Specifically, these prior art systems are not capable of approaching the desired production efficiency of one pound of water ice for each pound of liquid $CO_2$ consumed.

My earlier U.S. Pat. No. 5,775,111 discloses an apparatus and method for discharging $CO_2$ snow and ice along a generally horizontal path over and onto a load within an elongated insulated container from one partially opened end of the container. This patent discloses the discharging of liquid $CO_2$ inside a duct at pressures approaching 300 psi and spray discharging water at generally 60 psi pressure for commingling of the water and liquid $CO_2$ in order to form water ice or a mixture of water ice and $CO_2$ snow. However, this apparatus and method has the disadvantage of spraying the contents of the entire trailer or container from only one end and, thus, is not fully effective to cover all of the product being chilled.

Furthermore, the apparatuses of the prior art are assembled inside the container space, such as along the ceiling as disclosed in my U.S. Pat. No. 5,505,055 or adjacent the rear doors as disclosed in my U.S. Pat. No. 5,775,111. As such, the ice and snow making nozzles, piping and the like are subject to damage when struck by packages being shipped or the heavy equipment moving such packages. Embedding the piping and nozzles is disclosed for insulated railroad cars in my co-pending application, Ser. No. 09/167,535, filed Oct. 7, 1998.

Also, various different methods and apparatuses for forming $CO_2$ snow over perishable loads within elongated shipping containers heretofore have been known. My prior U.S. Pat. Nos. 4,640,460 and 5,398,522 each disclose the advantages of discharging opposing jets of liquid $CO_2$ against each other and further the additional advantage of lowering the temperature of the pressurized liquid $CO_2$, immediately before being jet discharged, to the triple point temperature (approximately −69° F. at 75 pounds per square inch absolute).

However, in addition to the first mentioned objective of obtaining maximum water ice production per unit of liquid $CO_2$ consumed, the prior art also fails to disclose an apparatus, for usage in an elongated shipping container, efficiently operable to form either a $CO_2$ snow layer or a water ice layer over a load in the shipping container.

SUMMARY OF THE INSTANT INVENTION

The ice/$CO_2$ snow producer of the instant invention overcomes the inefficiency of the prior art water ice forming devices by utilizing two adjacent paths of similarly laterally facing high pressure liquid $CO_2$ and water jets each capable of discharging fog-like jets of the corresponding liquid or by utilizing two opposing high pressure, fog-like jets of liquid $CO_2$ and water. In one form of the invention the liquid $CO_2$ jets are spaced along a generally horizontal delivery line therefor which extends along one side wall of an insulated trailer or container. The liquid $CO_2$ is supplied at an inlet pressure of approximately 275–300 psi and at a temperature of approximately −110° F. The water jets are similarly laterally outwardly directed from an adjacent, generally horizontal delivery pipe, which also extends along the one side wall, preferably spaced in line with, but slightly above, the liquid $CO_2$ delivery pipe so that each water jet is directly above a corresponding liquid $CO_2$ jet. The water, which is typically at ground temperature of about 50–60° F., is delivered to the water nozzles at a nozzle pressure of about 250–275 psi.

The adjacent high pressure fog-like jets of high pressure liquid $CO_2$ and water commingle at such a rapid rate that the fog-like discharge of water is almost immediately transformed into ice. Furthermore, the total rate of discharge of liquid $CO_2$ (in pounds per minute) is only slightly greater than the pounds per minute rate discharge of water from the water jets.

The generally horizontal adjacent supply lines or pipes and accompanying nozzles for the liquid $CO_2$ and water jets are located near the top of the side wall so that the formed ice falls onto the perishable goods to be transported. The delivery pipes and nozzles are preferably supported within a recess or embedded in the side wall for protection against damage by accidental contact during moving of the packages in the container.

The foregoing apparatus and method have surprisingly produced a much higher rate of conversion of the liquid $CO_2$ to ice than possible with prior art systems. In fact, it has been surprisingly found that the apparatus and method of the instant invention have produced quantities of ice at or above 96% of the quantity (by weight) of liquid $CO_2$ utilized to produce the ice. Without being bound hereby, it is presently believed that the formation of the extremely small droplet size of the fog-like spray discharges of the liquid $CO_2$ and water result in an optimum utilization of the high latent heat of evaporation of the liquid $CO_2$, which in turn rapidly transforms the small spray discharge droplets of water into ice at a much greater efficiency.

Although the apparatus and method disclosed in my U.S. Pat. No. 5,775,111 is capable of maintaining a combined spray or flow discharge of approximately 50 feet in length, the apparatus and method of the instant invention is capable of maintaining a combined spray or flow discharge of about 8 feet in length. This much lower discharge distance is a result of the fact that the apparatus and method of the instant invention utilize only fog-like high pressure discharges of water and liquid $CO_2$. Further, although the fog-like discharges project only about 8 feet from their source, soon after the fog-like discharges are started convection currents are set up in the container and extend the effective length of the fog-like discharges.

Alternatively, the generally parallel delivery pipes with inline adjacent jet nozzles can be mounted to the top of the storage container adjacent one side. The nozzles are then directed generally toward the other side.

In another form of the invention, two remote paths of opposing, laterally facing, high pressure, liquid $CO_2$ are positioned on each side of central high pressure water jets, each capable of discharging fog-like jets of the corresponding liquid. The upper interior sidewall areas of the associated container are occupied by corresponding longitudinal paths of inwardly facing liquid $CO_2$ jets and the central longitudinal area of the upper interior portion of the container is occupied by oppositely outwardly facing water jets. The inlet pressure of both the liquid $CO_2$ and water are at the high pressures described above. The opposed liquid $CO_2$ jets of each longitudinal path are preferably aligned opposite each other, whereas the water jets are directed intermediate adjacent liquid $CO_2$ jets of each longitudinal path.

When both the liquid $CO_2$ and water jets are used, each set of fog-like liquid $CO_2$ jet discharges is opposed by a corresponding set of fog-like water jet discharges intermediate the liquid $CO_2$ jet discharges, and these opposing liquid $CO_2$ and water discharges commingle and form water ice precipitation with a high proportion of $CO_2$ snow, on the order of 60% $CO_2$ snow. On the other hand, when only the remote $CO_2$ sets of opposing fog-like jet discharges are used, the opposing $CO_2$ discharges commingle with each other in a manner dissipating the remaining kinetic energy thereof and resulting in the formation and precipitation of $CO_2$ snow downward over the load in the container.

It is, therefore, an object of this invention to provide a permanently installed apparatus capable of producing water ice or $CO_2$ snow layers over perishable produce and the like placed within elongated storage containers, such as shipping containers and semitrailer container bodies, in a more efficient manner.

Another object of this invention is to provide an economical and inexpensive method of producing either a water ice or a $CO_2$ snow layer over products and produce stored within elongated containers.

Yet another object of this invention is to provide an apparatus and method of forming water ice or $CO_2$ snow, wherein a water ice or $CO_2$ snow layer may be quickly formed over a load 1S within a storage container.

Still another object of this invention is to provide a water ice and $CO_2$ snow producing apparatus which may be permanently installed within an elongated load container at a relatively low cost and without excess equipment and fixturing.

A further object of this invention is to provide an apparatus which will be capable of producing relatively large quantities of water ice or $CO_2$ snow in a short period of time and at a very reasonable cost.

A still further object of this invention is to provide a water ice making apparatus for elongated storage containers such as shipping containers and semitrailer container bodies which is set back from the container space by recess or embedding in the container wall insulation so as to avoid being struck by packages or moving equipment when moving packages into and out of the container.

Yet a still further object of this invention is to provide a permanently installed apparatus and method for forming water ice or $CO_2$ snow in a storage container which will conform to conventional forms of manufacture, be of simple construction and easy to use so as to be economically feasible and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
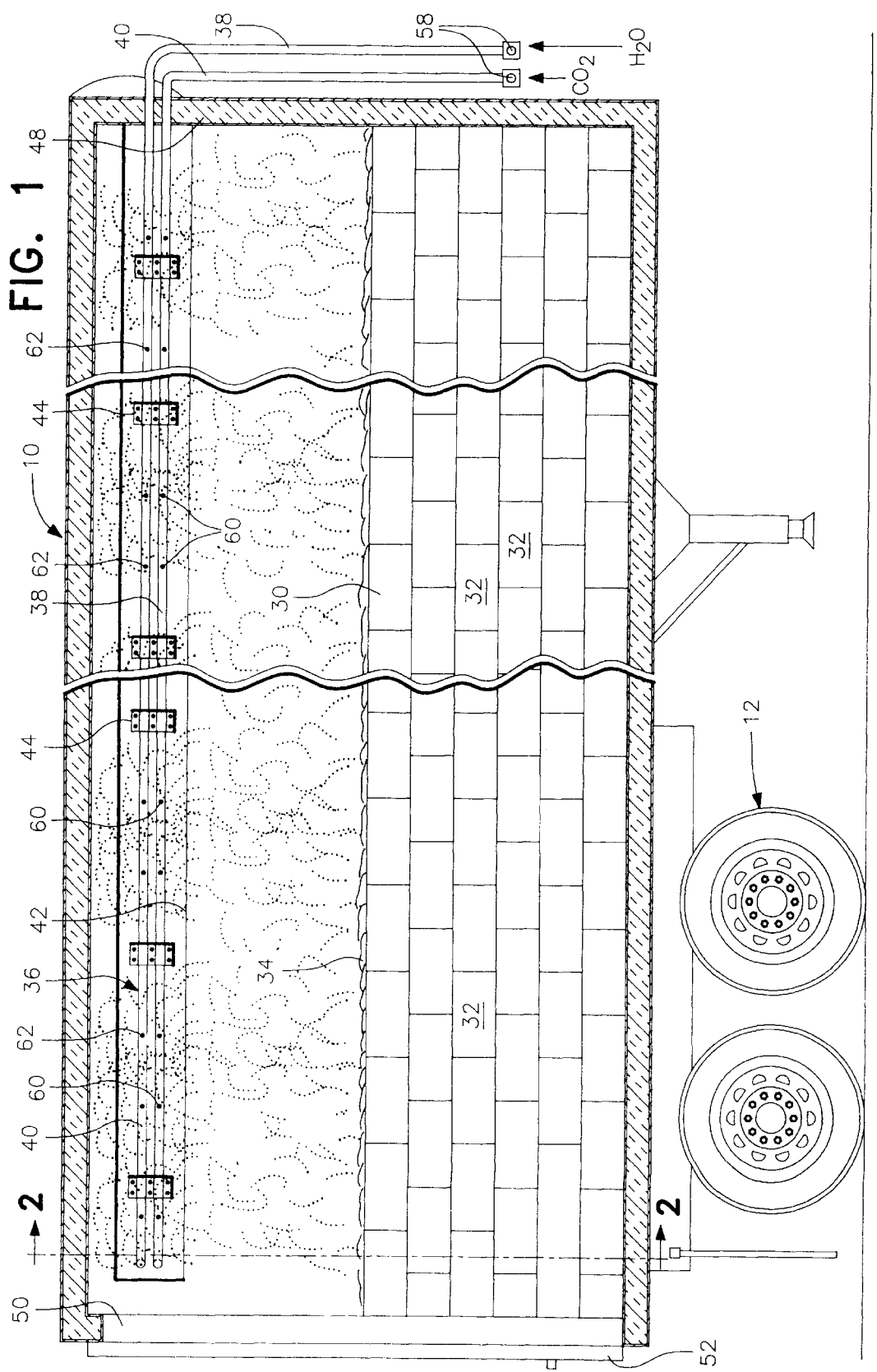
FIG. 1 is a fragmentary longitudinal vertical sectional view of a typical form of semitrailer to which a first form of the water ice forming apparatus of the instant invention has been mounted and with the apparatus in operation forming a layer of ice over a load within the semitrailer body.

Although only a few embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Referring now more specifically to the drawings, in particular FIG. 1, the numeral 10 generally designates a semitrailer container body in which a first form of the present invention is installed, including running gear referred to in general by the reference numeral 12. The container body 10 includes upstanding opposite side walls 14 and 16 interconnected at their upper margins 18 and 20 by a top wall 22 extending therebetween. The lower margins 24 and 26 of the side walls 14 and 16 are interconnected by a floor 28. In this preferred construction, the side walls 14, 16, top wall 22 and the floor 28 are insulated in any conventional manner.

The container body 10 is typically one half filled with a load 30 comprising stacked containers 32 containing perishable goods and the like for storage and shipping. A layer of ice 34 is being formed by the apparatus and method of the present invention over the load 30.

The ice making apparatus of FIG. 1 is generally referred to by the reference numeral 36 and incorporates a liquid $CO_2$ delivery pipe 38 and a water delivery pipe 40 generally parallel to each other. The upper margin of the side wall 14 preferably includes an outwardly opening recess 42 in which vertically spaced delivery pipes 38 and 40 are permanently secured in any conventional manner, such as by mounting straps 44. The delivery pipes 38 and 40 extend longitudinally along substantially the full length of the side wall 14 within the recess 42, and the mounting straps 44 each engage and support both of the pipes 38 and 40 at points spaced longitudinally therealong.

The forward end of the container body 10 is closed by an insulated front wall 48 and the rear of the container body 10 is open as at 50, but closeable by conventional assembly such as opposite side hinged and vented closure doors 52. The forward ends of the delivery pipes 38 and 40 extend outwardly through the front wall 48 and downwardly in vertical sections 39 and 41, respectively. The terminal end of each vertical section 39 and 41 is provided with a quick coupling 58 whereby supply lines of liquid $CO_2$ and water (not shown) may be quickly coupled to the vertical sections 39 and 41 and thus to horizontal delivery pipes 38 and 40.

Figure 2:
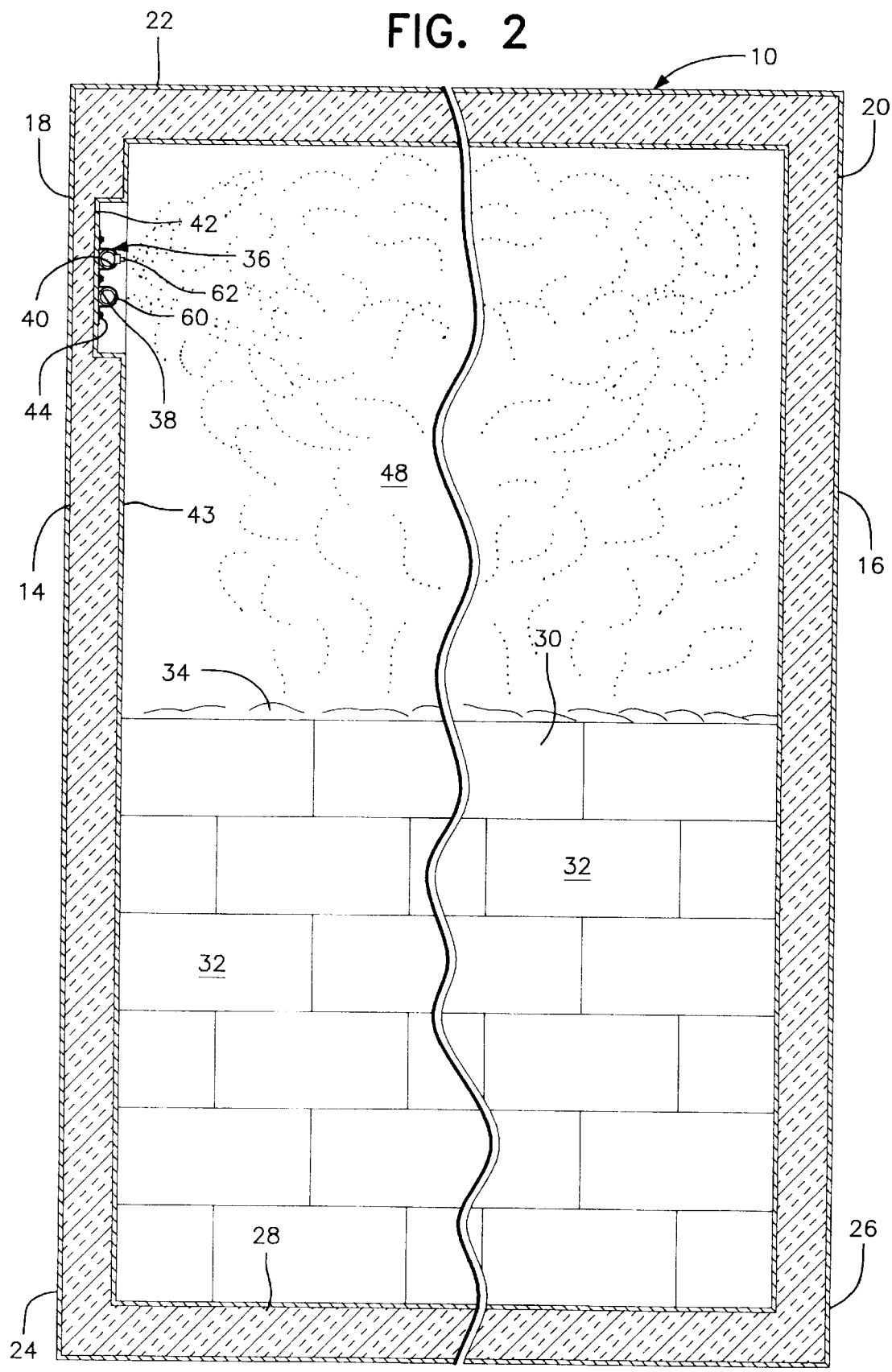
FIG. 2 is a fragmentary enlarged vertical sectional view taken substantially upon the plane indicated by the section line 2—2 of FIG. 1.

The delivery pipes 38 and 40, including vertical sections 39 and 41, are preferably constructed of high strength metal such as stainless steel and are capable of withstanding internal pressures well in excess of 300 psi. The delivery pipe 38 is provided with longitudinally spaced orifices 60, preferably of a size on the order of about 0.089 inch diameter, from which to discharge liquid $CO_2$ under pressure. The delivery pipe 40 is provided with an equal number of fine atomizing water spray nozzles or jets 62, preferably spaced directly above the liquid $CO_2$ orifices 60. As shown, the orifices 60 and spray nozzles or jets 62 direct the liquid $CO_2$ and atomized water laterally outward towards the opposite wall 16 of the container 10 (left to right in FIG. 2). As shown in FIG. 2, delivery pipes 38 and 40 are recessed sufficiently within recess 44 such that the pipes, including nozzles 62, are spaced inwardly from the inner surface 43 of the insulation of side wall 14. As such, the movement of containers 32, such as by vehicular front end loaders or the like, cannot easily strike the pipes or nozzles during movement of the containers into and out of container body 10, thus avoiding damage thereto.

The spray nozzles 62 are standard fine spray nozzles, and the water is supplied thereto through the water delivery pipe 40 at typical ground water temperature of between 50° and 60° F. but at a high water pressure, preferably about 250–275 psi at its respective coupling 58. The liquid $CO_2$ is supplied to the delivery pipe 38 in accordance with the present invention at about –110° F. and at a pressure of approximately 275 psi at its respective coupling 58.

The water is supplied to the water delivery pipe 40 from any suitable well or domestic supply of water, but the water is pressurized to between 250 and 275 psi at the coupling 58 through the utilization of a suitable pumping mechanism (not shown). Liquid $CO_2$ is conventionally stored at approximately 300 psi and may be supplied to the liquid $CO_2$ delivery pipe 38 directly from a suitable source of liquid $CO_2$ (not shown) connected to the delivery pipe 38 through liquid $CO_2$ coupling 58.

While stainless steel is the preferred material for delivery pipes 38 and 40, including vertical sections 39 and 41, other metals and materials may be utilized so long as they can withstand the requisite high pressures for the liquid $CO_2$ and water. Furthermore, the horizontal pipes 38 and 40 can be externally insulated, if desired.

In operation, only liquid $CO_2$, at a coupling pressure of approximately 275 psi, is initially discharged from the orifices 62 for a time sufficient, typically 8–10 seconds, to purge all of the ambient air from within the container body 10 through either a partially opened door 52 or vents (not shown) provided in the doors 52 when the later are fully closed. As soon as the ambient atmosphere has been purged from the interior of the trailer body 10 over the load 30, water at 50–60° F. is supplied to the water supply pipe 40 at a pressure of 250–275 psi. The high pressure water and liquid $CO_2$ being discharged from the supply pipes 40 and 38 form fog-like discharges and these fog-like discharges rapidly commingle. The approximately –110° F. discharge of liquid $CO_2$ combined with its high latent heat of evaporation causes the fog-like spray discharges of water from the nozzles 62 to almost instantaneously freeze resulting in water ice precipitation downward over the load 30 to form the ice layer 34.

For a typical container body of 50 feet in length, there are preferably each about eighteen orifices 60 and nozzles 62 in accordance with the present invention, along the length of the container body 10. Thus, each vertical pair of an orifice 60 and nozzle 62 is spaced from the next adjacent pair about 2–3 feet, preferably about 2½ feet. The total discharge of liquid $CO_2$ from the orifices 60 is on the order of 170–180 pounds per minute, or 1700–1800 pounds in ten minutes. The total discharge of water from the jets 62 at 250–275 psi is on the order of 165–175 pounds per minute, or 1650–1750 pounds in ten minutes.

Using the above apparatus and method including water at southern ground temperature of approximately 60° F., a ten minute "run" of ice production results in the formation of 1680 pounds of ice mixed with a small quantity of $CO_2$ snow. Consequently, the apparatus and method of the instant invention are capable of developing ice at a rate equal to approximately 96% of the rate of liquid $CO_2$ consumed, whereas most other methods of producing ice through the utilization of liquid $CO_2$ are capable of realizing only approximately a 50% rate of ice production, although the apparatus and method disclosed in my prior U.S. Pat. No. 5,775,111 increased that rate to approximately 75% when the water pressure discharge was increased from the about 60 psi disclosed in the patent to approximately 100 psi.

Figure 3:
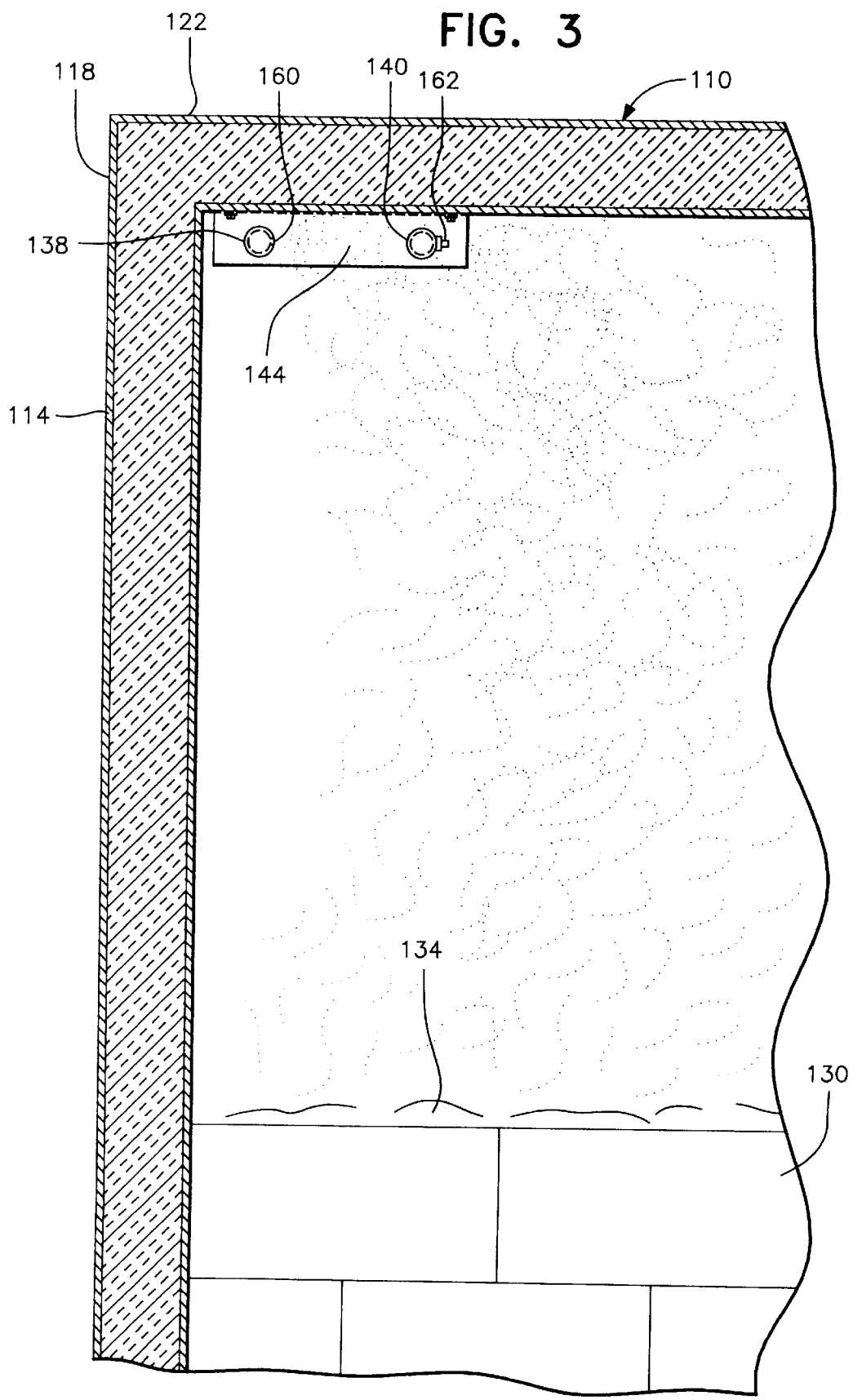
FIG. 3 is a further enlarged fragmentary vertical sectional view illustrating the upper right hand portion of FIG. 2, but incorporating a modification of the first form of the invention.

Referring now more specifically to FIG. 3 of the drawings, the numeral 110 generally designates a modified form of container body which is substantially identical to the container body 10, but does not include a recess corresponding to the recess 42. Rather, a liquid $CO_2$ delivery pipe 138 and a water delivery pipe 140 extend longitudinally along the top wall 122 adjacent the upper margin 118 of the side wall 114 corresponding to the side wall 14, and pipes 138 and 140 are permanently supported from the top wall 122 at points spaced longitudinally therealong by support brackets 144. The inlet ends of the delivery pipes 138 and 140 extend downwardly in vertical sections (not shown) through the front wall of the container body in substantially the same manner as that illustrated in FIG. 1 with regard to delivery pipes 38 and 40 and vertical sections 39 and 41. The delivery pipes 138 and 140 include longitudinally spaced orifices 160 and longitudinally spaced discharge jets 162 corresponding to the orifices 60 and jets 62. The delivery pipes 138 and 140 deliver high pressure liquid $CO_2$ at an inlet pressure of about 275–300 psi, and high pressure water at an inlet pressure of about 250–275 psi, respectively, to discharge orifices 160 and discharge jets 162.

The nozzles 162 discharge fog-like jets of water toward the opposite side wall of the container body 110 and the orifices 160 discharge fog-like jets of liquid $CO_2$ in the same direction. The fog-like discharges of water and liquid $CO_2$ commingle in the same manner as that described in connection with the orifices 60 and nozzles 62 hereinabove such that the water discharged from the nozzles 162 is almost instantly transformed into ice which precipitates downwardly onto the load 130, corresponding to the load 30, in order to form an ice layer 134, corresponding to the ice layer 34 over the load 130.

Although the fog-like discharge of liquid $CO_2$ from the orifices 160 is directed somewhat upon the opposing surfaces of the delivery pipe 140, only a small fraction of the wide angle fog-like discharge of liquid $CO_2$ actually contacts the pipe 140. However, the pipe 140 is considerably cooled by contact of the liquid $CO_2$ discharge thereon. As a result, the water being discharged from the nozzles 162 is precooled and even more rapidly transformed into ice upon being spray discharged through the nozzles 162. However, inasmuch as some heat absorption of the liquid $CO_2$ sprayed upon the pipe 140 is used to cool the water within the pipe 140, the rate of formation of the ice layer 134 is substantially identical to the rate of formation of the ice layer 34.

Figure 4:
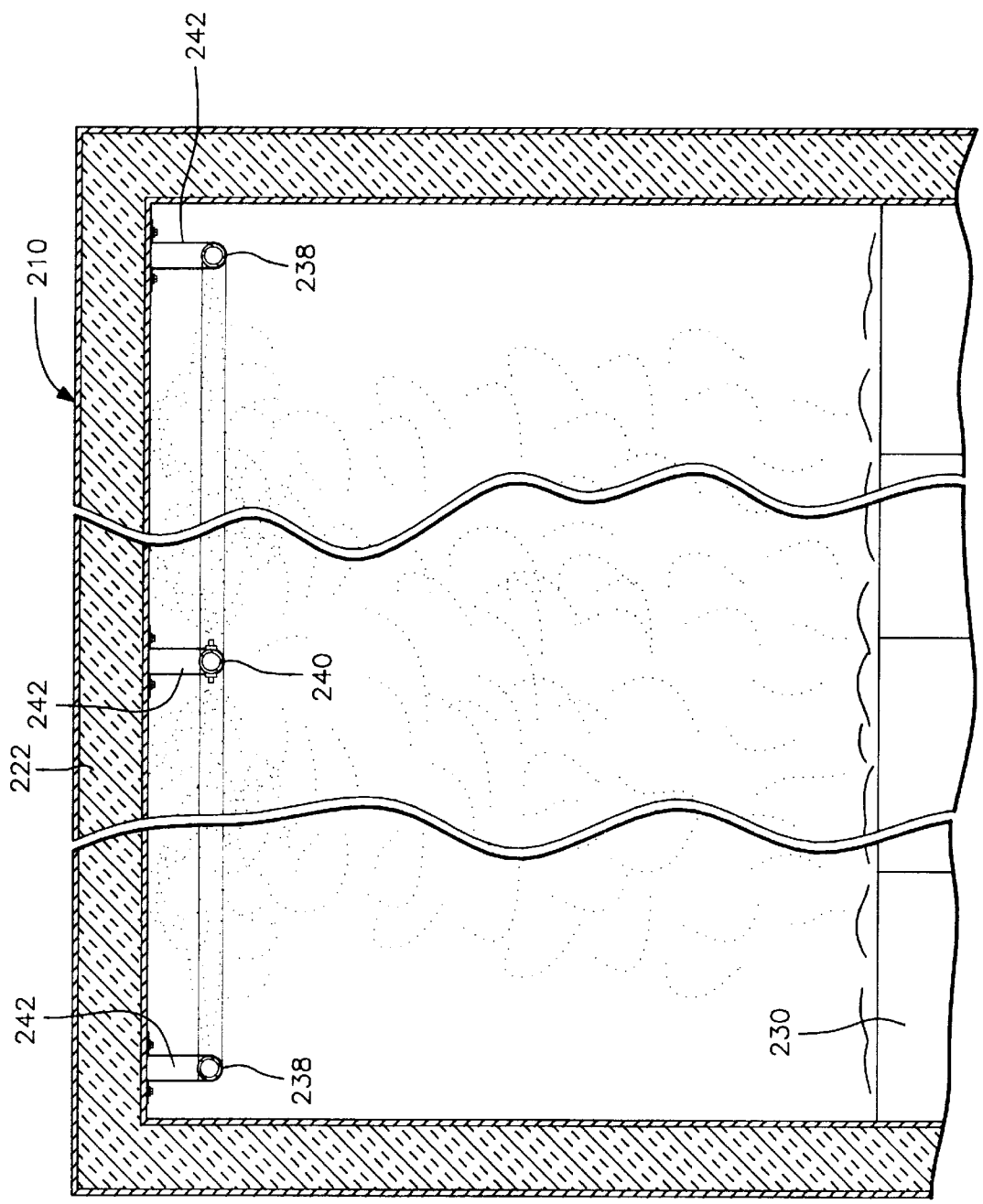
FIG. 4 is a fragmentary enlarged transverse vertical sectional view illustrating another form of the invention operational to produce either a water ice layer over an associated load or a $CO_2$ snow layer thereover.
Figure 5:
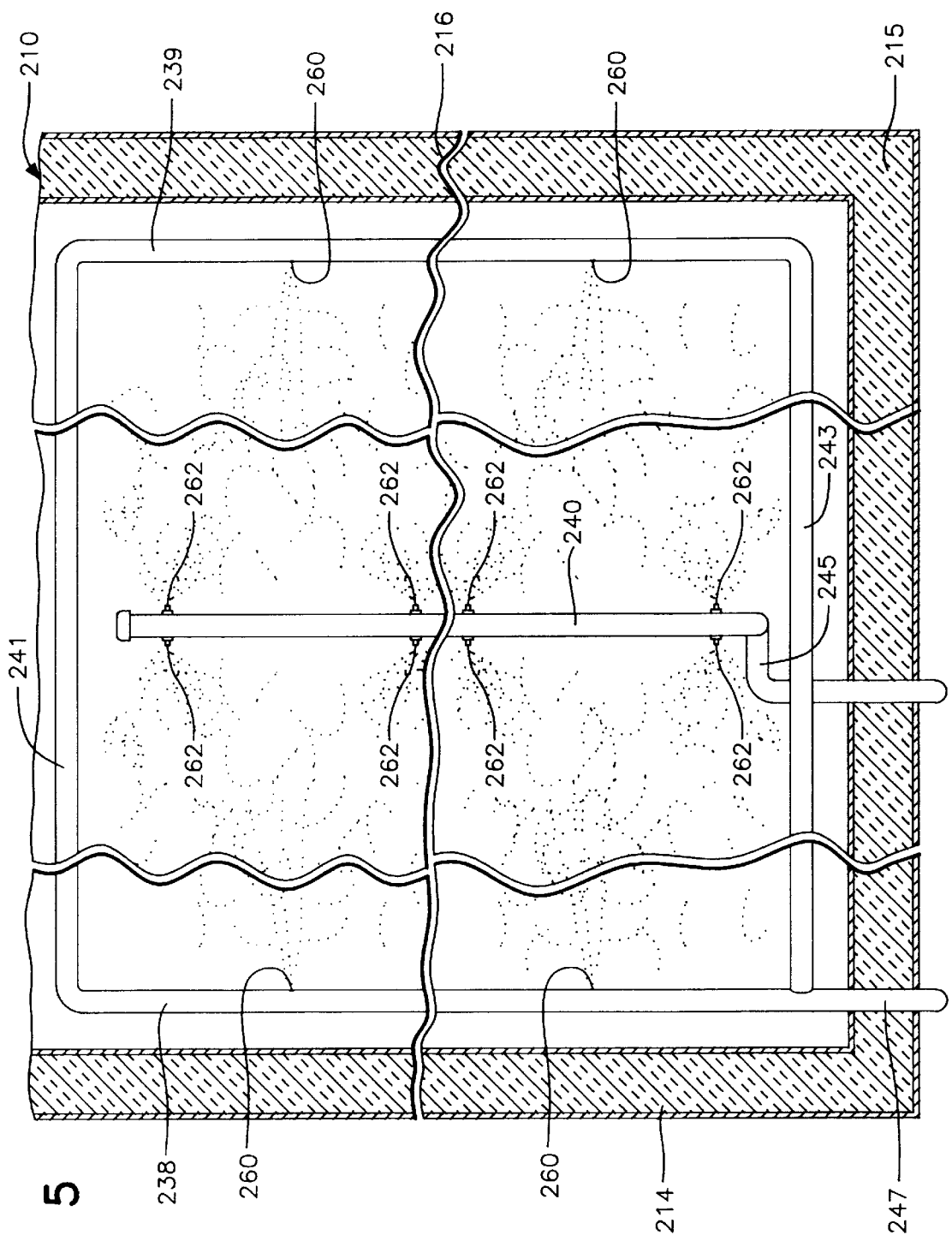
FIG. 5 is a horizontal sectional view of the structure illustrated in FIG. 4.

Referring now more specifically to FIGS. 4 and 5 of the drawings, there may be seen another form of the invention wherein a semitrailer container body is referred to generally by the reference numeral 210. The container body 210 is substantially identical to the container body 10 and includes upper opposite longitudinal side liquid $CO_2$ delivery pipes 238 and 239 and a center longitudinal water delivery pipe 240, the pipes 238, 239 and 240 being permanently supported from the top wall 222 of the container body 210 in any convenient manner such as by support brackets 242.

As may be seen from FIG. 5, the liquid $CO_2$ delivery pipes are interconnected at the front end of the container body 210 by a forward transverse pipe 241 and at the rear end of the container body 210 by a rear transverse pipe 243. The rear end of the water delivery pipe 240 includes a downturned, laterally directed section 245 which extends forwardly through front wall 215 of the container body 210 and downwardly to a coupling at the front of the container body. The rear end of liquid $CO_2$ delivery pipe 238 also includes forward directed portion 247 which extends out through the front wall 215 and downwardly to a coupling.

The delivery pipes 238 include longitudinally spaced orifices 260 corresponding to the orifices 160 and the delivery pipe 240 includes pairs of oppositely directed water discharge jets 262 corresponding to the discharge jets 62 and 162. It will be noted that the liquid $CO_2$ discharge jets 260 are generally facing each other along delivery pipes 238 and 239, whereas water discharge jets 262 are spaced in-between orifices 160. Thus, the high pressure water from one jet 262 enters between the high pressure liquid $CO_2$ entering from adjacent orifices 260.

In operation, when it is desired to form a layer of water ice corresponding to the layers 34 and 134, liquid $CO_2$ is supplied to the delivery pipes 238 and 239 at preferably about 250–275 psi and discharged from the orifices 260 for approximately 8–10 seconds in order to purge the ambient atmosphere from within the container body 210. Thereafter, water, typically at ground temperature of between 50° F. and 60° F. is suppled to the delivery pipe 240 at preferably about 250–275 psi, the opposing orifices 260 being aligned with each other transversely of the container body 210 and the water spray nozzles or jets 262 being longitudinally offset longitudinally of the container body 210 centrally intermediate pairs of opposing water discharge orifices 260. The offset of the $CO_2$ orifices 260 and water jets 262 affords greater commingling of the fog-like jet discharges of liquid $CO_2$ and water in order to create ice precipitation downward over the load 230 in order to form a water ice load thereover.

On the other hand, if the load 230 is to be covered by a layer of $CO_2$ snow, after the initial 8–10 second discharge of liquid $CO_2$ from the orifices 260, water is not supplied to the water delivery pipe 240 and liquid $CO_2$ is allowed to be further discharged from the orifices 260. The opposing fog-like jet discharges of liquid $CO_2$ commingle with each other in a manner dissipating the remaining kinetic energy thereof and form $CO_2$ snow precipitation downward over the load 230 in order to form a $CO_2$ snow layer thereover. It may therefore be seen that the apparatus disclosed in FIGS. 4 and 5 is capable of selectively forming a water ice layer over the load 230 or a $CO_2$ snow layer over the load 230.

The foregoing is considered as illustrative only of the principles of the invention. Numerous modifications and changes readily will occur to those skilled in the art. For example, the vertical portions 39 and 41 of delivery pipes 38 and 40 are shown connected at one end of the horizontal delivery pipes 38 and 40. If desired, the vertical sections 39 and 41 can be connected to the Ai horizontal delivery pipes 38 and 40 at any position along their horizontal extent, with the ends of pipes 38 and 40 both being capped off. Also, if it is desired to produce an ice layer throughout only a portion of the longitudinal extent of the container body 110, the delivery pipes 38, 40 and 138, 140 can be properly positioned longitudinally along container body 10 or 110 adjacent the portion of the body for which the ice layer is to be formed.

Further, if it is desired, the delivery pipes 238 and 239 could be recessed near the top of the side walls 214 and 216 of the container body 210 and the delivery pipe 240 could be upwardly recessed in the top wall 222 with the nozzles 262 being slightly downwardly and outwardly inclined from such an attendant recess. Therefore, it is not desired to limit the invention to the exact construction and operation shown and described, and, accordingly, all suitable modifications and equivalents may be resorted to, falling within the scope of the invention.

What is claimed as new is as follows:

1. In combination with an elongated, closed and intermittently ventible container having upstanding opposite side walls and a top wall extending between and interconnecting upper margins of said side walls, a pair of delivery pipes mounted generally horizontally in said container adjacent said top wall and extending longitudinally of said container, one of said delivery pipes including longitudinally spaced first fog-like spray jet discharge means for liquid $CO_2$, the other of said delivery pipes including longitudinally spaced second fog-like spray jet discharge means for discharging fog-like spray jets of water, said first and second jet discharge means being positioned relative to each other for intimate commingling of said fog-like jets, said one delivery pipe being adapted to be communicated with a source of liquid $CO_2$ under pressure of at least substantially 250 psi and at a temperature of about −110° F., the other of said delivery pipes being adapted to be communicated with a supply of water under pressure of at least substantially 250 psi.

2. The combination of claim 1, wherein said delivery pipes are spaced apart vertically along said one side wall and said one delivery pipe is spaced below said other delivery pipe.

3. The combination of claim 1, wherein said delivery pipes are supported from said top wall, closely adjacent the latter and horizontally spaced apart.

4. The combination of claim 1, wherein said container has insulation along said side walls and said top wall and said delivery pipes are positioned within a recess in said insulation.

5. The combination of claim 1, wherein said first and second fog-like spray jet discharge means discharge said liquid $CO_2$ and water in the same lateral direction toward the other of said container walls.

6. The combination of claim 1, wherein said one delivery pipe is disposed adjacent one of said side walls and said other delivery pipe is disposed generally centrally intermediate said side walls, said first and second spray jet discharge means at least generally horizontally opposing each other.

7. The combination of claim 6 including a third delivery pipe disposed adjacent said other of said side walls and also being adapted to be communicated with said source of liquid $CO_2$ under pressure and including longitudinally spaced third fog-like spray jet discharge means for liquid $CO_2$ generally horizontally directed toward said other delivery pipe, said other delivery pipe including longitudinally spaced fourth fog-like spray jet discharge means for water generally horizontally directed toward said other side wall.

8. An apparatus for forming a blanket of ice and $CO_2$ snow over an elongated load which comprises at least two generally horizontal delivery pipes extending longitudinally a substantial distance along and above said load, one of said delivery pipes including a first set of longitudinally spaced nozzles for discharging fog-like spray jets of water, said $CO_2$ and water jet discharge nozzles being positioned relative to each other for intimate commingling of said fog-like jets to form ice and $CO_2$ snow for deposit over a substantial portion of said elongated load, a delivery means connected to said one delivery pipe for delivering liquid $CO_2$ under an initial delivery pressure of at least 250 psi, and a delivery means connected to said other delivery pipe for delivering water to said other delivery pipe at a pressure of at least about 250 psi, said apparatus further including a third horizontal delivery pipe extending longitudinally with said two delivery pipes and having a third set of discharge nozzles for discharging fog-like spray jets of liquid $CO_2$, said third delivery pipe connected to said first delivery pipe to receive liquid $CO_2$ supplied to said first delivery pipe under said initial pressure of at least 250 psi, and said third set of nozzles being aligned longitudinally on said third delivery pipe with said first set of nozzles on said first delivery pipe and directed generally at said first set of nozzles so that liquid $CO_2$ fog-like spray jets discharged from said first set of nozzles and said third set of nozzles are directed towards each other to facilitate commingling of said fog-like $CO_2$ spray jets to form $CO_2$ snow.

* * * * *